(12) United States Patent
Moricca

(10) Patent No.: US 9,982,684 B2
(45) Date of Patent: May 29, 2018

(54) HYBRID METAL COMPRESSOR BLADES

(71) Applicant: General Electric Company, Schenectady, NY (US)

(72) Inventor: Maria del Pilar Moricca, Greenville, SC (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 14/820,778

(22) Filed: Aug. 7, 2015

(65) Prior Publication Data

US 2017/0037867 A1   Feb. 9, 2017

(51) Int. Cl.

| | |
|---|---|
| *F01D 5/14* | (2006.01) |
| *F04D 29/32* | (2006.01) |
| *B22F 5/04* | (2006.01) |
| *F01D 5/28* | (2006.01) |
| *B23K 26/342* | (2014.01) |
| *B33Y 10/00* | (2015.01) |

(52) U.S. Cl.
CPC .............. *F04D 29/324* (2013.01); *B22F 5/04* (2013.01); *B23K 26/342* (2015.10); *F01D 5/147* (2013.01); *F01D 5/28* (2013.01); *F01D 5/288* (2013.01); *B22F 2207/00* (2013.01); *B33Y 10/00* (2014.12); *F05D 2230/31* (2013.01)

(58) Field of Classification Search
None
See application file for complete search history.

(56) References Cited

U.S. PATENT DOCUMENTS

| | | | |
|---|---|---|---|
| 3,610,776 | A | 10/1971 | Petrie et al. |
| 4,006,999 | A | 2/1977 | Brantley et al. |
| 4,022,547 | A | 5/1977 | Stanley |
| 4,480,956 | A | 11/1984 | Kruger |
| 5,112,194 | A | 5/1992 | More |
| 5,375,978 | A | 12/1994 | Evans et al. |
| 5,392,514 | A | 2/1995 | Cook et al. |
| 5,640,767 | A | 6/1997 | Jackson et al. |
| 5,690,472 | A | 11/1997 | Lee |
| 5,837,960 | A | 11/1998 | Lewis et al. |

(Continued)

FOREIGN PATENT DOCUMENTS

| | | |
|---|---|---|
| EP | 1 229 146 | 8/2002 |
| EP | 1 743 729 | 1/2007 |

(Continued)

OTHER PUBLICATIONS

European Search Report and Opinion issued in connection with corresponding EP Application No. 16181136.9 dated Dec. 13, 2016.

(Continued)

*Primary Examiner* — Woody Lee, Jr.
*Assistant Examiner* — Theodore Ribadeneyra
(74) *Attorney, Agent, or Firm* — Nixon & Vanderhye P.C.

(57) ABSTRACT

A hybrid compressor blade having an airfoil portion and a root portion that includes an outer shell comprised of one or multiple types of material that are each located at a predesignated section on the compressor blade, having at least one transition region between two different sections. The transition region is comprised of one or multiple layers with a compositional gradient based upon materials in the neighboring sections to provide a gradual transition from one section to another.

18 Claims, 2 Drawing Sheets

(56) References Cited

U.S. PATENT DOCUMENTS

| | | |
|---|---|---|
| 6,099,257 A | 8/2000 | Schilling |
| 6,233,823 B1 | 5/2001 | Schilling |
| 6,282,786 B1 | 9/2001 | Evans et al. |
| 6,428,910 B1 * | 8/2002 | Jackson ............... B32B 15/01 148/422 |
| 6,607,358 B2 | 8/2003 | Finn et al. |
| 6,696,144 B2 | 2/2004 | Holowczak et al. |
| 7,104,761 B2 | 9/2006 | Burdgick et al. |
| 7,384,240 B2 | 6/2008 | McMillan et al. |
| 7,837,446 B2 | 11/2010 | McMillan |
| 7,887,300 B2 | 2/2011 | Mazzola et al. |
| 7,963,745 B1 | 6/2011 | Liang |
| 2002/0098298 A1 | 7/2002 | Bolton et al. |
| 2004/0126237 A1 | 7/2004 | Jackson et al. |
| 2004/0126266 A1 | 7/2004 | Jackson et al. |
| 2009/0028697 A1 * | 1/2009 | Shi ..................... F01D 5/147 415/200 |
| 2014/0030497 A1 * | 1/2014 | Tryon ................ C23C 28/3215 428/215 |
| 2015/0003995 A1 | 1/2015 | Xu |
| 2015/0003997 A1 | 1/2015 | Mironets et al. |

FOREIGN PATENT DOCUMENTS

| | | |
|---|---|---|
| EP | 1743729 A2 | 1/2007 |
| JP | 2001269784 | 10/2001 |

OTHER PUBLICATIONS

Hofmann, Douglas C., et al., "Developing Gradient Metal Alloys through Radial Deposition Additive Manufacturing", Scientific Reports 4, Article No. 5357 (2014), Jun. 19, 2014, 8 pages.

Extended European Search Report cited in European Patent Application No. 16181136.9, dated Dec. 13, 2016 (8 pages).

* cited by examiner

HYBRID METAL COMPRESSOR BLADES

The present invention discloses a hybrid gas turbine component, in particular a gas turbine hybrid compressor blade comprising an inner core and an outer shell having two or more regions of different materials. The outer shell includes one or more metals or metal alloys that are strategically placed on specific regions of the hybrid compressor blade.

BACKGROUND OF THE INVENTION

A gas turbine includes an inlet section that allows air intake into the gas turbine, and a compressor section that includes rotor and stator wheels, which draw in and compress air to be mixed with fuel in a combustor section downstream of the compressor section. Combustion gases generated in the combustor sections are used to turn turbine wheels in the turbine section to generate power. Located on the compressor rotor and stator wheels, gas turbine compressor blades are placed such that the blades are exposed to the inlet air and the heat produced during operation of the compressor. The compressor blades include an airfoil section that aids in drawing and compressing inlet air, and a root section that keeps the blades on the compressor wheels.

During operation, compressor blades may be exposed to corrosion. Out of the major sections of a compressor blade, the airfoil section of the compressor blade is the most exposed section to the harsh environment, and is most susceptible to damage.

There is a continuing desire to improve airfoil efficiency and durability of a compressor blade. Conventionally, the compressor blade is made up of a single material selected to fulfill airfoil performance requirements for durability and efficiency. The material ideally has the ability of coping with erosion, corrosion, and fatigue of the blade over time. However, some regions of the airfoil may require additional strengths and/or different physical properties than other regions on the airfoil. For example, the leading edge of the airfoil may endure more erosion and corrosion than the trailing edge, and other areas may require a material having a higher strength than the leading edge.

Attempts to solve the problem of having different requirements on different regions of the airfoil portion include providing airfoils with different coatings of material to solve corrosion and/or erosion issues. However, coatings may not be the optimal solution to the problem of enduring different regional issues since some coatings are normally applied to the airfoil portion as a whole. Coatings may also have potential crevice corrosion or material interface compatibility issues between the layers of coatings.

In addition, a material that may provide the optimal durability, erosion, corrosion, strength, and efficiency for all regions on an airfoil of the compressor blade may not be economically feasible for manufacturing and use in an industrial gas turbine. Accordingly, there is a need for an improved blade that can efficiently fulfill localized airfoil performance requirements such as erosion, strength, corrosion, and fatigue capability. The present invention provides a solution for (or presents an alternative to solve) the compressor blade airfoil durability issues described.

BRIEF SUMMARY OF THE INVENTION

The present invention provides a blade for gas turbine applications whereby the regional erosion and corrosion issues of the airfoil section of a compressor blade can be minimized. Another aspect of the invention provides a more efficient method to manufacture a compressor blade airfoil capable of providing the desired erosion and corrosion resistance as well as required mechanical properties on specific regions of a compressor blade.

The traditional methods of manufacture may require multiple processes to manufacture the embodiment compressor blade and include the different regional materials as described. Traditional methods of manufacturing may not address the incompatibility issues that occur at the interface between the different materials used in forming the compressor blade.

The present invention uses Additive Manufacturing (AM) methods to implant the different desired materials at specific regions of the compressor blade to attain the required capabilities at each particular region while minimizing compatibility issues.

A hybrid compressor blade that embodies the present inventive concept includes an inner core and an outer shell comprising multiple materials. An airfoil portion of the compressor blade includes a leading edge and a trailing edge that are connected by a pressure side and a suction side. The outer shell includes at least two regions, and each region may have at least one material that includes one or more metals or metal alloys, and the composition of each material is tailored to provide the desired properties at a predesignated region of the airfoil.

Another aspect of the invention relates to at least one transition zone existing between the inner core and outer shell, and at least one transition region between each of different sections on the outer shell. A gradient composition is created in the transition zone and the transition region by using the Additive Manufacturing methods. Transition zones and transition regions are formed by depositing one or more layers of material, the composition of each layer may gradually transitioned from one section to another to ensure that the materials form a compatible bond at the interfaces between the regions and layers.

A method to manufacture an embodiment compressor blade entails defining an inner core. The inner core can be processed by conventional forging methods or using an Additive Manufacturing method. The inner core material is determined by the properties that are desired to be enhanced at this region. The method also includes disposing at least one transition zone on the inner core surface using Additive Manufacturing method. The transition zone may be composed of one or multiple layers with a compositional gradient selected according to the composition of the materials used on the inner core and the corresponding outer shell section(s). The method also includes choosing a second material composition in powder form that can provide the properties that are desired to be enhanced at a particular section of the outer shell, and disposing the chosen material on the preceding transition layer using Additive Manufacturing method. The process of depositing materials to form transition layers and sections of the outer shell may be repeated until the desired configuration is attained.

A significant advantage of the novel hybrid compressor blades disclosed herein includes providing tailored material compositions at specific regions of the compressor blade with the purpose of fulfilling the strength, erosion, and corrosion properties desired at each of the regions, thereby enhancing damage tolerance, erosion resistance, and corrosion resistance of the compressor blade, and extending the life of the compressor blade. An advantage of the novel manufacturing method disclosed herein is that the AM method allows the ability of having several material compositions in different regions on a single component, and addresses the material interface compatibility concerns by using transition zone and transition regions between different materials. Additional benefits include providing a method to produce a compressor blade that would not have been feasible or would have been difficult to produce using conventional methods. Conventional methods would require the use of multiple manufacturing processes to attain the same effect, which would increase the manufacturing cost. A single process method of manufacturing is believed to be more time efficient and economical.

DETAILED DESCRIPTION OF THE INVENTION

Figure 1:
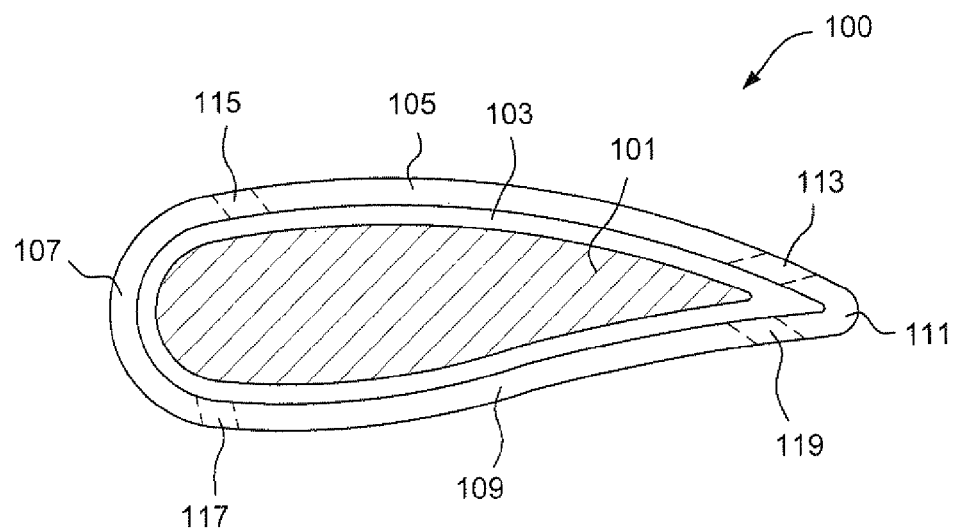
FIG. 1 is a schematic cross-section of a compressor blade airfoil portion having an inner core base material, a subsequent transition zone and an outer shell comprised of multiple sections and respective transition regions between the sections.

The present invention comprises a compressor blade that includes multiple outer shell regions containing different materials each selected to fulfill the different erosion, strength, corrosion, and durability requirements desired for their particular region of the compressor blade.

The core of the compressor blade may be one type of material or a combination of materials that provides the required strength to the compressor blade. An outer shell of the airfoil section of the compressor blade comprises various materials in different sections of the outer shell, the materials are chosen based on suitability to fulfill the most critical requirements of each specific region on the airfoil section. Each of the sections may include one single type of material or a combination of different types of materials to provide the desired level of corrosion and erosion resistance required at each of the particular section. The section may extend along the compressor blade in the radial direction, such that the root portion of the compressor blade also encompass the same outer shell sections as the airfoil portion.

An Additive Manufacturing method, such as Electron Beam Melting, Direct Metal Laser Melting, Direct Metal Laser Sintering, Laser Deposition, or a combination thereof, can be used to manufacture the embodiments such that the manufacturing process is more time efficient and economical. Furthermore, for certain types of materials, mechanical properties of the components produced using the Additive Manufacturing methods may enhance the physical properties of components that are produced by conventional methods.

Similar parts in the embodiments are similarly numbered in the drawings. The wording "about" includes above and under 10% of the number that it describes throughout this application. A hybrid compressor blade as described in this application is defined as a compressor blade having multiple layers, zones, sections and regions of material that form the compressor blade.

A cross-sectional view of an airfoil portion 100 of an embodiment compressor blade is shown in FIG. 1. The airfoil portion 100 has an inner core 101 that provides the shape of the airfoil. Layers of different materials are added to the external surface of the inner core 101 to form an outer shell. Each type of material is strategically applied to a section of the outer shell to provide advantageous protection to the airfoil portion 100.

The inner core 101 comprises a material that is at least one of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

The sections of the outer shell, for example, section 107 on the leading edge of the airfoil portion 100, section 105 on the pressure side of the airfoil portion 100, section 111 on the trailing edge of the airfoil portion 100, and section 109 on the suction side of the airfoil portion 100, may each host a different material that has properties that are best suited for the conditions that each section would be subjected to. The outer shell comprises a material that is at least one of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

Between each of the sections 105, 107, 109 and 111 are transition regions 113, 115, 117, and 119 on the outer shell. Each of the transition regions encompasses one or multiple layers with a compositional gradient based on the materials in neighboring sections to create a gradual transition from one section to another. For example, transition region 115 may have a gradient composition of the materials located in section 105 and 107, such that the material composition from sections 105 and 107 would gradually taper off towards one another to form a compatible bond between sections. Similarly, transition region 117 includes a gradient composition of the materials located in sections 107 and 109; transition region 119 includes a gradient composition of the materials located in sections 109 and 111; and transition region 113 includes a gradient composition of the materials located in sections 111 and 105.

A transition zone 103 is located between the inner core 101 and the outer shell, which includes sections 105, 107, 109 and 111, and transition regions 113, 115, 117, and 119. Transition zone 103 located between the inner core 101 and the outer shell may be composed of one or multiple layers of material with a compositional gradient selected according to the composition of the materials used on the inner core and the corresponding section on the outer shell.

For example, the section of transition zone 103 that is located between the inner core 101 and section 105 may have a gradient composition of the material in the inner core 101 and section 105, such that the material composition from the inner core 101 and section 105 would gradually taper off towards one another to form a compatible bond between regions. Similarly, the section of transition zone 103 between the transition region 115 and the inner core 101 includes a gradient composition of the material in transition region 115, which is based on the material located in sections 105 and 107, and the inner core 101. Other sections of the transition zone 103 also include compositional gradients based on the immediate neighboring materials from the sections and/or transition regions and the inner core 101.

Materials used in each of the sections 105, 107, 109 and 111 may be different from one another. Alternatively, the material used in some of the sections 105, 107, 109 and 111 may be the same. Determination of the type of material to be used in each of the sections is dependent upon the capabilities desired in the particular section of the blade.

The depth of the outer shell, including sections 105, 107, 109 and 111, and the transition regions 113, 115, 117, and 119, is determined according to performance requirements and may be adjusted to provide the erosion, corrosion, damage tolerance, and strength required by the compressor blade specific application. The depth of the transition regions is also based upon the compositional steps and layers required to create the optimal transition between the different outer shell sections. Depth of each of the sections 105, 107, 109 and 111 may be the same or different.

The inner core 101 that constitutes the core of a compressor blade may be manufactured with the presently described layers using the Additive Manufacturing methods indicated herein. However, the inner core 101 may also be fabricated using various techniques, such as forging and casting.

Figure 2:
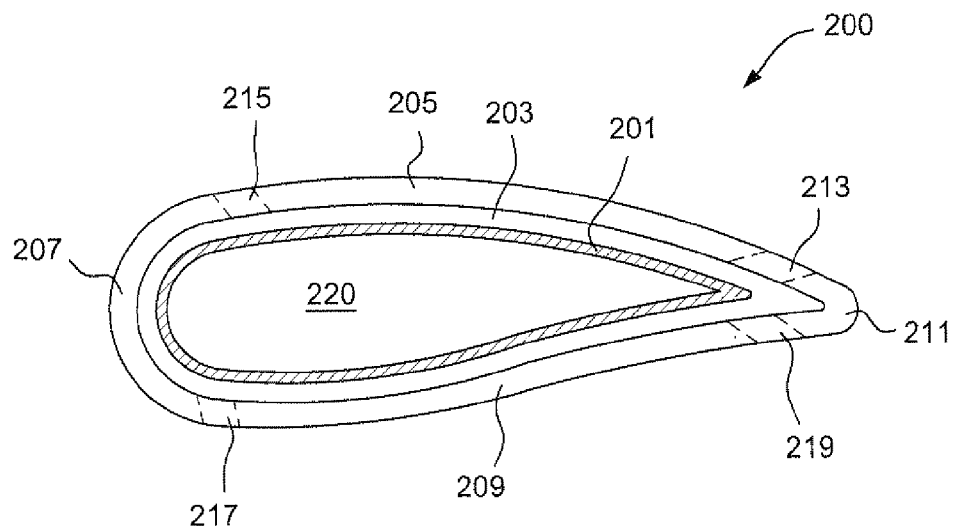
FIG. 2 is a schematic cross-section of a compressor blade airfoil portion showing an alternate form that incorporates a hollow core, an inner core, a transition zone, and an outer shell comprised of several sections with respective transition regions between the sections.

In another embodiment of the compressor blade, the presently described layers and regions of materials can be applied to an airfoil portion 200 that has an inner section 220 that may be hollow, include having inner cooling channels or other functional elements inside the inner section 220 as shown in FIG. 2. The inner section 220 may be enclosed by an inner core 201 that functions as a base material to interact with the transition zone 203, which interacts with the outer shell sections 205, 207, 209 and 211, and transition regions 213, 315, 217 and 219.

Material used in each of the sections 205, 207, 209 and 211 may be different from one another. Alternatively, material used in some of the sections 205, 207, 209 and 211 may be the same. Determination of the type of material to be used in each of the sections in airfoil portion 200 is based upon the capabilities desired in the particular sections of the compressor blade.

The depth of the outer shell, including the sections 205, 207, 209 and 211, and transition regions 213, 215, 217, and 219, is determined according to performance requirements and may be adjusted to provide the erosion, corrosion, damage tolerance and strength required by the compressor blade specific application. The depth of the transition regions is also based upon the compositional steps and layers required to create the optimal transition between the different blade sections.

The inner core 201 may also be a single type of material or a combination of materials that are conventionally used in the manufacturing of the core of compressor blades. The inner core 201 comprises a material that is at least one of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

Figure 3:
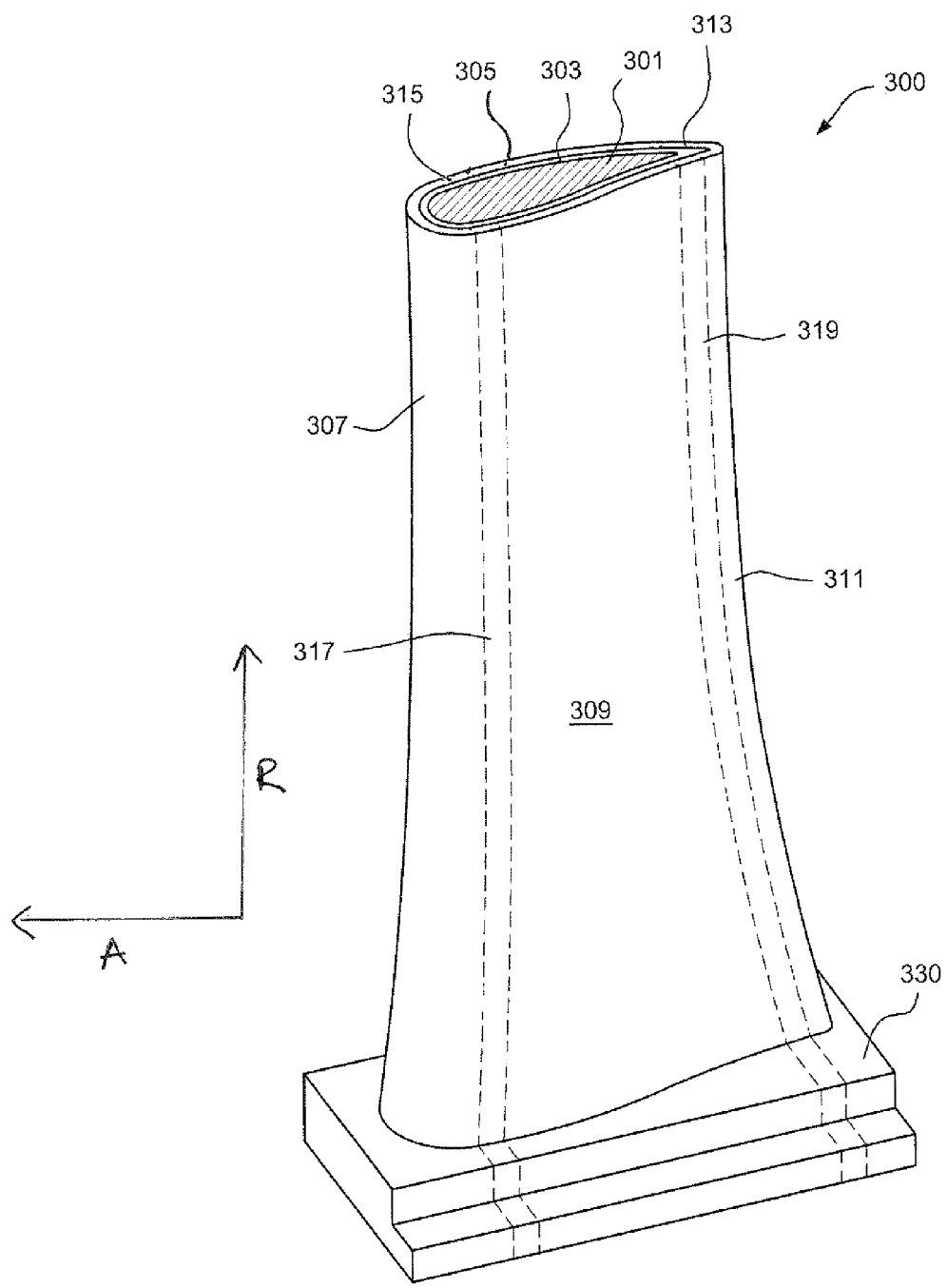
FIG. 3 illustrates a compressor blade having multiple sections and the respective transition regions located between the different sections along the length of the compressor blade.

FIG. 3 provides a side view of an embodiment hybrid compressor blade that shows an airfoil portion 300 and a root portion 330. The compressor blade is shown with an axial direction A and a radial direction R in view of the compressor blade's location on the gas turbine. The root portion 330 is radially inward of the airfoil portion 300. A cross section view of the radially outer portion of the airfoil portion 300 is also shown.

The airfoil portion 300 has an inner core 301 in the center portion of the airfoil portion 300. A transition zone 303 encases the inner core 301. The transition zone 303 may be composed of one or multiple layers of material with a compositional gradient based upon the composition of the materials used on the inner core 301 and the corresponding sections in the outer shell, including sections 305, 307, 309 and 311, and the transition regions 313, 315, 317 and 319 as shown in FIG. 3.

The transition region 317 includes a gradient composition of the materials located in sections 307 and 309, such that the material composition from sections 307 and 309 would gradually taper off towards one another to form a compatible bond between the sections. The transition region 317 extends along the length of the airfoil portion 300 and root portion 330 with sections 307 and 309, which also extend along the length of the airfoil portion 300 and root portion 330. Similarly, transition regions 313, 315, and 319 extends along the length of the airfoil portion 300 and root portion 330 to include a gradient composition of the materials from sections 305, 309 and 311.

In another embodiment, the transition zone, transition regions and sections on the compressor blade may have a different shape and size than as shown in FIGS. 1 to 3. Furthermore, the number of sections of materials used on a compressor blade may differ depending upon the desired properties that are most critical on a particular region of the compressor blade. Nonetheless, between each of the different types of materials, there will be a transition zone or transition region comprised of one or multiple layers with a compositional gradient based upon the neighboring materials to create a gradual transition from one section to another while minimizing interface and compatibility issues.

The compositional gradient in the transition zones and the transition regions described herein may be a linear tapering of material in each respective zone or region, and/or the transition zones and transition regions may have a non-linear gradient composition that encompasses each of the neighboring materials.

A method to manufacture a compressor blade that encompasses an inner core and the sections described herein includes selecting a material in powder form, such as a metal alloy powder; and depositing the metal alloy powder on the external surface of an inner core of the compressor blade to form an outer shell using an Additive Manufacturing method.

A method to manufacture an embodiment hybrid compressor blade having sections of different materials, a transition zone between different layers, and transition regions between the sections include defining the inner core, the different sections, and the transition regions based on the material properties that are desired to be enhanced at the each particular sections. The material composition for the inner core and the different sections are selected based on the material properties that are desired to be enhanced at the each section. The inner core may be manufactured using the Additive Manufacturing methods indicated herein or using various processes, such as, forging and casting. The method also includes disposing materials that form a transition zone between the inner core and the outer shell using an Additive Manufacturing method. The transition zone may be composed of one or multiple layers with the same or different compositional gradients selected according to the materials used on the inner core and the immediately neighboring section and/or transitional region. The method also includes disposing materials to form the neighboring section on the surface of a transition zone and/or transition region using an Additive Manufacturing method. The process of depositing transition zones, transition regions and subsequent sections may be repeated until the desired configuration is attained.

As an example, a transition zone is deposited between the inner core made of material A, and an outer shell section B made of material B, On the side of the transition zone adjacent to the inner core, the amount of material A deposited will gradually decrease as progressing towards the side adjacent to section B. Similarly, the amount of material B applied in the transition zone will gradually increase as progressing towards the side towards section B. If a linear compositional gradient is applied, then in the center of the transition zone, the amount of both materials, A and B, may be at 50% of the amount present in the respective neighboring sections. If a non-linear compositional gradient is applied, then the amount of materials A and B may not be at 50% in the center of the transition zone, and may be at a percentage that is applicable to ensure a gradual transition from one section to another while minimizing interface and compatibility issues.

By placing different materials that can provide the desired properties on specific regions of the compressor blade, the material cost to manufacture a compressor blade with high durability and strength may be lowered because expensive materials are only applied to regions of the compressor blade as needed. Manufacturing the compressor blade using Additive Manufacturing methods may also lower cost of manufacturing by providing a single process of manufacturing that can deposit many different materials. Manufacturing using Additive Manufacturing methods may also increase some of the respective desired properties of the materials being deposited onto the compressor blade.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine hybrid compressor blade comprising:
   an airfoil having a leading edge and a trailing edge that are connected by a pressure side surface and a suction side surface, and a root portion radially inward of the airfoil portion;
   an inner core within the airfoil, wherein the inner core is formed of a first material;
   a transition zone covering the inner core;
   an outer shell covering the transition zone and surrounding the inner core, the outer shell includes the leading edge surface on a first section formed of a second material different from the first material, the trailing edge surface, the pressure side surface formed of a third material different from the second material, and the suction side surface of the airfoil; and
   a transition region in the outer shell between the first section and the second section of the outer shell, wherein the transition region is an amalgam of the second and third materials, and
   wherein the transition zone between the inner core and the outer shell has a first transition section aligned with the transition region of the outer shell, and the transition zone is an amalgam of the first, second and third materials.

2. The hybrid compressor blade of claim 1, wherein the transition region includes a first edge neighboring the first section and a second edge, opposite to the first edge, neighboring the second section.

3. The hybrid compressor blade of claim 2, wherein the transition zone has a second transition section aligned with the first section of the outer shell, and the second transition section is an amalgam of the first and second materials, but not the third material.

4. The hybrid compressor blade of claim 3, wherein the composition of the amalgam of the first and second materials in the second transition section varies with respect to the concentrations of the first material to the second material along a direction from the inner core to the outer shell.

5. The hybrid compressor blade of claim 2, wherein a center of the transition region has a ratio of 50% by weight or volume of the second material and 50% by weight or volume of the third material.

6. The hybrid compressor blade of claim 1, wherein the transition zone includes a first surface neighboring the inner core, and a second surface, opposite to the first surface, neighboring the outer shell.

7. The hybrid compressor blade of claim 6, wherein the composition of the transition zone gradually changes from a maximum of the first composition at the first surface to a minimum of the first composition at the second surface.

8. The hybrid compressor blade of claim 2, wherein the amount of the second material in the transition region varies from one edge of the transition region to an opposite edge of the transition region.

9. The hybrid compressor blade of claim 6, wherein the transition zone is comprised of multiple layers.

10. The hybrid compressor blade of claim 1, wherein the second material and the third material each includes at least one of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

11. The hybrid compressor blade of claim 1, wherein first material is at least one of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

12. A hybrid compressor blade, comprising:
   an airfoil having a leading edge and a trailing edge that are connected by a pressure side surface and a suction side surface, and a root portion radially inward of the airfoil portion;
   an inner core within the airfoil;
   a transition zone covering the inner core;
   an outer shell covering the transition zone and surrounding the inner core, the outer shell includes the leading edge surface, the trailing edge surface, pressure side surface and the suction side surface of the airfoil, and the outer shell includes sections each formed of different material; and
   at least one transition region included in the outer shell wherein the transition region is between the sections of the outer shell,
   wherein the sections and the transition regions extend along the radial length of the airfoil portion and the root portion of the compressor blade.

13. A method of manufacturing a compressor blade that includes an inner core and an outer shell having sections wherein each section is formed of a different type of material, the method comprising:

defining locations for a first section of the outer shell, a second section of the outer shell and a transition region between the first and second sections of the outer shells;

selecting a first outer shell material composition for the first outer shell section and a second outer shell material composition for the second outer shell section, wherein the second outer shell material composition differs from the first outer shell material composition selecting an inner core material which differs from the first and second outer shell materials;

forming the inner core from the inner core material using one of an Additive Manufacturing method, forging, and casting;

forming a transition zone on a surface of the inner core by, using at least one of an Additive Manufacturing process, forging and casting, wherein the formation of the transition zone includes depositing an amalgam of the inner core material, the first outer shell material and the second outer shell material to form a region of the transition zone aligned with the transition region of the outer shell, forming the outer shell the at least one of an Additive Manufacturing process, forging and casting, wherein the formation of the outer shell includes depositing the first outer shell material composition to form the first section of the outer shell, depositing the second outer shell material composition to form the second section of the outer shell, and depositing an amalgam of the first and second outer shell materials to form the transition region of the outer shell.

14. The method of manufacturing of claim 13, wherein the Additive Manufacturing method includes Electron Beam Melting, Direct Metal Laser Melting, Direct Metal Laser Sintering, Laser Deposition, or a combination thereof.

15. The method of manufacturing of claim 13, wherein the materials for the outer shell sections are chosen from the group consisting of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

16. The method of manufacturing of claim 13, wherein the inner core material is chosen from the group consisting of a superalloy, iron based alloy, nickel based alloy, cobalt based alloy, an austenitic stainless steel, a martensitic stainless steel, a ferritic stainless steel, a carbon steel, an alloy steel, a titanium based alloy, an inter-metallic titanium alloy, and a combination thereof.

17. The method of manufacturing of claim 13, wherein the compositional gradient in the transition region includes a non-linear combination of materials to create a gradient composition to transition from one section to another.

18. The method of manufacturing of claim 13, wherein the compositional gradient in the transition region creates a linear tapering of material from one section to another.

* * * * *